May 19, 1970     V. W. STEINHAUER ET AL     3,512,272

TACHISTOSCOPIC PROJECTOR

Filed June 7, 1968     2 Sheets-Sheet 1

VERNON W. STEINHAUER
DALE S. BRAY
INVENTORS

ATTORNEYS

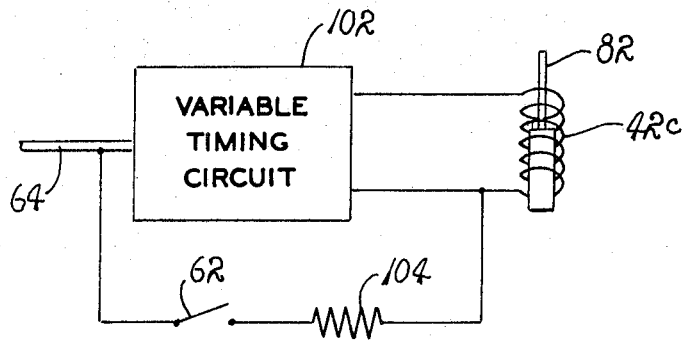
FIG. 4.
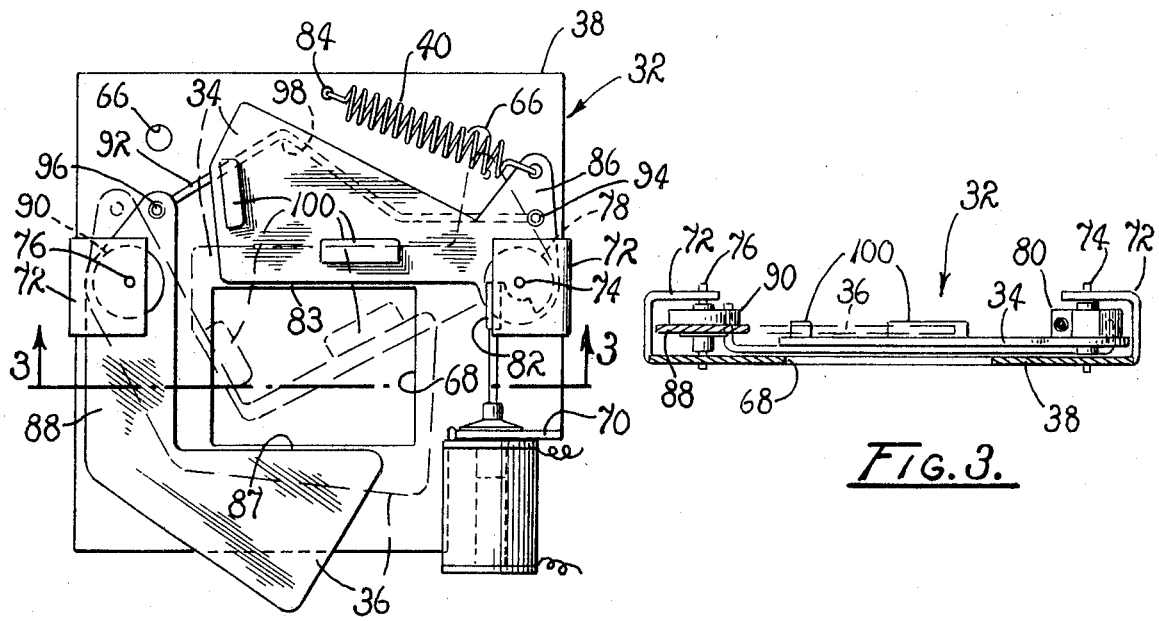
FIG. 2.
FIG. 3.
VERNON W. STEINHAUER
DALE S. BRAY
INVENTORS 3,512,272
TACHISTOSCOPIC PROJECTOR
Vernon W. Steinhauer, and Dale S. Bray, Fresno, Calif., assignors to Teaching Technology Corp., a corporation of California
Filed June 7, 1968, Ser. No. 735,267
Int. Cl. G09b 17/04; G03b 9/14
U.S. Cl. 35—35                                          1 Claim

ABSTRACT OF THE DISCLOSURE

A tachistoscope or a flash reader which includes the usual lamp and lens system for the projection of a beam of light and a novel mechanical shutter mechanism including a pair of masking flags which in the closed position thereof cover a rectangular projection aperture and in the open position thereof fully uncover the aperture to permit passage of the light therethrough and full frame exposure of film material associated therewith, the masking flags being moved to open posiiton by energization of a solenoid which is time pulsed by a variable timing circuit, each of the masking flags having a generally triangular portion and a rock arm, the rock arms being mounted on spaced pivots in substantial alignment with one edge of the aperture, and a link interconnecting the rock arms, one of the pivots having associated therewith a member with a distal portion engaged by the end of a shaft operated by the solenoid for rocking the member and causing simultaneous movement of the masking flags for uncovering the projection aperture during the period of pulsing, and a spring attached to one of the rock arms for moving the masking flags to closed position.

BACKGROUND OF INVENTION

The present invention relates to a tachistoscope or a flash reader and more particularly to a tachistoscopic projector having a novel shutter mechanism which provides for timed projection and exposure of a full frame of film strip material and is effective fully to uncover a projection aperture for exposing all of the projected material in the frame.

Heretofore, flash readers or tachistoscopic projectors have been effective in exposing only a portion of projected material at a time and the timed exposure thereof has been mechanically controlled by adjusting the bias or loading of springs employed to open the shutter mechanisms.

SUMMARY OF INVENTION

It is, therefore, an object of the present invention to provide a tachiostoscopic projector having an improved shutter mechanism.

Another object is to provide a shutter mechanism movable to permit the passage of a projected beam of light and effective to uncover completely a projection aperture for full frame exposure of film.

Still another object is to provide a shutter mechanism arranged for operation by a solenoid, the energization of which is under the control of circuitry having variable time delay components for varying the period of energization of the solenoid.

These and other objects and advantages are achieved by a tachiostoscopic projector having a source of light and a lens system for projecting a light beam, and a novel shutter mechanism associated therewith including masking flags pivotally mounted and interlinked for simultaneous movement, for completely uncovering a rectangular projection aperature and exposing a full frame of film strip material in the path of the light beam, the length of time the shutter is maintained in open position being dependent upon the energization of a solenoid connected to pivot the masking flags to open position, the length of time of energization of the solenoid in turn being dependent upon circuitry associated therewith having a timing network variable to provide a range of exposure times of the film strip material, and switch means for by-passing the timing network in order to expose the projected film strip material for an indefinite period of time.

BRIEF DESCRIPTION OF DRAWINGS

FIG. 2 is an elevational view of the unique shutter mechanism forming a part of the present invention and incorporated in the projector of FIG. 1.

FIG. 3 is a sectional view taken generally along line 3—3 of FIG. 2 looking in the direction of the arrows.

FIG. 4 is a block diagram schematically illustrating the timing component of the projector.

DESCRIPTION OF EMBODIMENT

Figure 1:
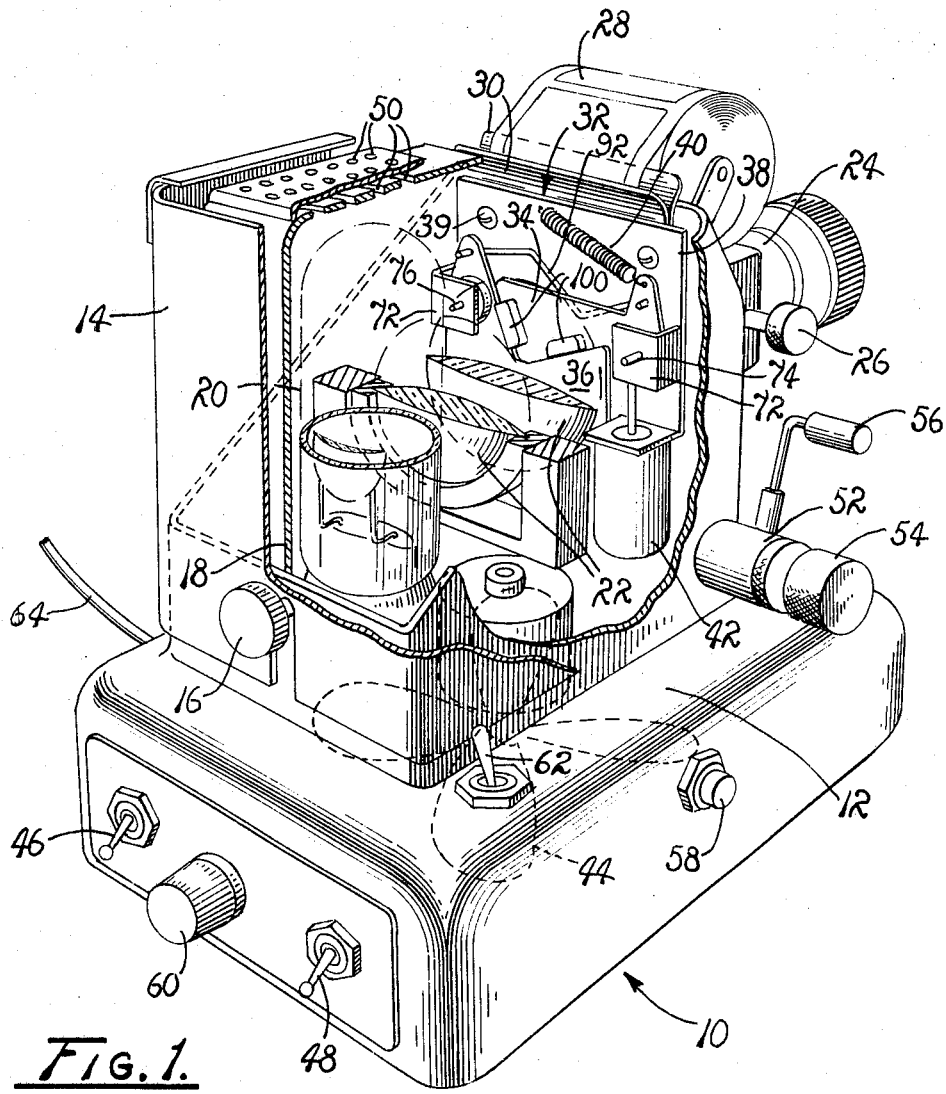
FIG. 1 is a perspective view of a tachistoscopic projector embodying the principles of the present invention, parts thereof being broken away to show internal features thereof.

Referring to the drawings, FIG. 1 illustrates a tachistoscopic projector or flash reader designated generally by reference numeral 10 and including a hollow body structure 12, of metal or other suitable material, to which a removable cover 14 of double wall construction is secured, as by a setscrew 16 threaded into the body structure 12 and engaging an inner wall 18 of the cover. Mounted within the body 12 is a projection lamp 20 and a lens system 22 which projects light from the lamp in a beam through a tube 24 carrying a focusing lens, not shown, the tube being telescopically related to the body 12 for focusing adjustment and held in adjusted position by a screw 26.

Mounted on body 12 is a film strip 28 having a lead end passed between a pair of film guide plates 30 for disposition across the path of the beam of light for projection and exposure of the material thereon, such exposure being controlled by a shutter mechanism designated generally by reference numeral 32. Shutter mechanism 32 includes a pair of masking flags or shutters 34 and 36 pivotally mounted on a back plate 38 secured to the body 12 by attaching screws 39, the flags being urged to closed or masking position by a spring 40. Also mounted on the plate 38 is a solenoid 42 operatively connected to masking flag 34 in a manner hereinafter described.

Within the body structure 12 is a motor driven fan 44, the fan and the lamp being controlled by switches 46 and 48, respectively, conveniently connected in the usual manner to insure that the fan motor is operating before the lamp may be turned on. The fan 44 functions to induce a downward draft of cooling air and to facilitate such a purpose the top of the cover 14 is provided with suitable perforations 50 and a screen or grill, not shown, is provided in the bottom of the body 12.

The film strip 28 is usually of the type having discrete rectangular frames of the material or intelligence to be projected and spaced perforations at the edges thereof for engagement by teeth on a pair of sprockets. A pair of such sprockets, not shown, are mounted on a shaft, not shown, and disposed to engage the film strip 28, the shaft being journaled in a journal sleeve 52 and a suitable bearing in the other side of the body 12, the shaft having connected thereto a knurled knob 54 for rotational control thereof. An indexing mechanism, not shown, is associated with the sleeve 52 for releasably fixing the relation of the knob 54 to the sleeve, the positioning of the sleeve, in turn, being under the control of a handle lever 56 for turning the sleeve and the knob therewith for positioning a film frame in registration with the projected beam of light.

The body structure 12 also houses the components of a timing circuit actuated by a press button switch 58 for timed exposure of the material of the film strip 28, the timing of the circuit being varied by turning the time variation knob 60. Bypass circuitry under the control of a toggle switch 62 provides for indefinite exposure of the film strip material.

The projector 10 is adapted to operate from conveniently available alternating current supply outlets, the current being supplied to the projector by suitable wiring or a cable 64, fragmentarily shown in FIG. 1.

Referring to the shutter mechanism 32 as shown in FIGS. 2 and 3, the back plate 38 is provided with a pair of perforations 66 which receive the attaching screws 39 and has formed therein a rectangular projection aperture 68 with which a film strip frame is adapted to be placed in registration for aligning the film strip frame with the beam of light projected through the aperture. Plate 38 is formed with a projecting portion 70, to which the solenoid 42 is suitably secured, and with bracket plate superposed portions 72. Portions 72 and the back plate 38 are provided with aligned openings which receive the ends of a pair of pivot shafts 74 and 76 and are so located that the axes of the shafts are substantially aligned with the upper edge of aperture 68. Shaft 74 is secured in a hub 78 affixed to one end of the masking flag 34, the hub 78 being notched to provide a distal portion 80 spaced from the axis of the shaft 74. Upon energization, the solenoid 42 actuates a shaft 82, an end of which engages the distal portion of the hub and swinging the flag to the open position shown in full lines in FIG. 2.

Masking flag 34 may be considered to have a generally triangular portion with the pivot shaft 74 located generally adjacent one apex thereof and the shaft axis substantially aligned with one edge 83 of the flag. With the pivot shafts 74 and 76 in substantial alignment with the upper edge of the frame projection aperture 68, movement of the flag 34 to open position places the aforementioned edge 83 thereof in substantial alignment with the pivot shafts. However, with the solenoid de-energized, the flag 34 moves to the closed position shown in phantom lines in FIG. 2 under the urging of the spring 40, the length of the shaft 82 being proportioned to serve as a limiting stop for the flag in its closed position. The spring 40 extends between an attachment point 84 on the back plate 38 and a rock arm 86 forming a part of the masking flag 34 laterally directed from the aforementioned generally triangular portion thereof.

Masking flag 36 is also formed with a generally triangular portion having an edge 87 which is disposed generally parallel to edge 83 of flag 34 in the open positions of the flags. In their closed positions, the edges 83 and 87 overlap slightly, as shown in phantom lines in FIG. 2, and the flags cooperate to cover or mask off the aperture 68 and intercept the passage of the beam of light therethrough. Flag 36 is substantially L-shaped and has a rock arm 88 extending from one corner of the generally triangular portion and generally perpendicular to the edge 87 thereof, the arm having affixed thereto a hub 90 to which pivot shaft 76 is suitably secured.

In order that the flags 34 and 36 move together in synchronism for full frame exposure of the aperture 68, they are interconnected by means of an angulated link 92 having a bend 98 therein, one end thereof being pivoted to the rock arm 86, as at 94, the other end thereof being pivotally connected to the rock arm 88, as at 96. The angulation of the link 92 provides for adjusting the effective length thereof between the pivot connections 94 and 96 as by varying slightly the angle at the bend 98 with a pair of pliers or other suitable tools.

The distance between the pivot connection 96 and the axis of pivot shaft 76 is substantially equal to the distance between the pivot connection 94 and the pivot shaft 74. Also, the link 92 is disposed to one side of a line passing through the pivot shafts 74 and 76 and is substantially equal to the distance therebetween, which provides a parallelogram effect upon swinging of the rock arms 86 and 88. It will be noted from a viewing of FIG. 2 that the link 92 is adjusted to dispose edge 87 of the triangular portion of flag 36 in substantial alignment with the lower edge of the frame aperture 68 when edge 83 of the triangular portion of flag 34 is disposed substantially aligned with the upper edge of the frame aperture, thereby providing full frame exposure of the aperture.

The configuration and disposition of the several parts of the shutter mechanism 32 are highly effective in obtaining an efficient full frame opening and closing of the masking flags under the influence of the solenoid 42 and the spring 40, respectively. The inertia of the parts in the opening and the closing of the shutter mechanism and the amount of time of energization of the solenoid are readily determined in order to provide any desired length of shutter opening and timed exposure of the film strip material. It will be noted that the weight of the flag 36 assists in the opening of the shutter mechanism, the weight of the flag 34 serving to assist the closing thereof. With the parts proportioned as shown and described, the rock arms and the flags of which they are a part are required to move through an angle of only about 30°, yet the mechanism is effective in fully uncovering the projection aperture for full frame exposure of the material on the film strip.

It has been found that in the rapid closure of the shutter mechanism, vibration is sometimes imparted to the flags. To preclude this, flag 34 may be provided with a pad or pads 100 of suitable resilient energy absorbing material, for example, sponge rubber or foam plastic, so as to engage the edge 87 of the flag 36 in the closed positions of the flags.

The timed energization of solenoid 42 may be effected by any one of a number of electrical variable timing circuits known in the art. Thus, as schematically illustrated in FIG. 4, a conventional variable electronic timing circuit 102 is connected to the cable 64 and to the coil 42c of the solenoid 42 so that, upon actuation of switch 58, current flows through the coil and energizes the coil for a length of time dependent upon the setting of knob 60. This serves to extend shaft 82 and hold the shutter mechanism for timed exposure of the film strip material.

A bypass circuit including switch 62 and a resistance 104 of suitable value, serves to pass current around the timing circuit 102 for exposure of the film strip material for as long as the switch remains closed.

OPERATION

The operation of the device of the present invention is believed to be clearly apparent and is briefly summarized at this point. With the film strip 28 mounted on the projector 10 and the lead end thereof passed between the film guide plates 30, the cable 64 is connected to a source of alternating current and switches 46, 48 and 62 are closed. With switch 62 closed, the timing circuit 102 is bypassed and shutter mechanism 32 is maintained in open position permitting passage of the beam of light from the lamp 20. Control knob 54 is manipulated to bring the focusing frame of the film strip into view and tube 24 is moved in or out for focusing purposes after which it is locked in place by setscrew 26. Handle 56 is then turned in the proper direction to place the focusing frame in registration with the aperture 68 after which switch 62 is opened and the shutter mechanism returns to closed position thereof. The instructor or other person using the projector then turns knob 54 to advance the film strip to the frame bearing material which is to be flashed in the timed exposure thereof. After checking that the knob 60 is set at the desired speed for time of exposure, the instructor alerts the students and then presses the button for switch 58. The students are given time to record their reactions to the flashed material. If deemed necessary and the instructor desires, the knob 60 may be readjusted for a faster or a slower speed and the material again flashed for viewing by the students. In preparation for flashing the next frame of material, knob 54 is turned to proper position until it indexes, the students are alerted, and the button of switch 58 is pressed. It will be appreciated that the procedure may be repeated and varied according to the desires of the instructor and the needs of the students. Any time it is desired to show the student what has been flashed, either after each frame or for the exposure of a summarizing frame, switch 62 is actuated to hold aperture 68 uncovered to show such material for as long as necessary.

There has thus been provided a tachisotoscopic projector or flash reader which is of simple and relatively inexpensive construction and operates in a facile and reliable manner to open fully a shutter mechanism of novel construction for full frame timed exposure of material to be flashed.

Although the invention has been herein shown and described in what is conceived to be the most practical and preferred embodiment, it is recognized that departures may be made therefrom within the scope of the invention, which is not to be limited to details disclosed herein but is to be accorded the full scope of the claims so as to embrace any and all equivalent devices and apparatus.

Having described our invention, what we claim as new and desire to secure by Letters Patent is:

1. A shutter mechanism comprising
   (A) a light barrier having a substantially rectangular opening through which light is adapted to be projected;
   (B) a pair of pivot shafts substantially normal to the light barrier disposed on opposite sides of the opening in substantially equally spaced relation thereto and in substantial alignment with an edge of the opening;
   (C) a masking flag mounted on each shaft for reciprocal pivotal movement between respective predetermined closed and retracted positions,
      (1) one of said flags being substantially L-shaped, having a first framing edge extended along an adjacent side of the opening when in retracted position and a second framing edge in substantially right angular relation to the first edge extended along a side of the opening contiguous with said adjacent side of the opening when in retracted position, the second edge being substantially radially disposed to the pivot shaft of the opposite flag when in closed position,
      (2) said opposite flag having a first framing edge disposed substantially radially of its pivot shaft extended along the side of the opening with which the shafts are substantially aligned when in retracted position and substantially conforming to the second edge of said one flag when in closed position, and said opposite flag having a second edge substantially right angularly related to the first edge of said opposite flag substantially conforming to the first edge of said one flag when in closed position; and
   (D) powered means for correspondingly moving said flags to their respective closed and retracted positions.

References Cited

UNITED STATES PATENTS

| | | | |
|---|---|---|---|
| 3,341,951 | 9/1967 | Barnette | 35—35.2 |
| 3,400,473 | 9/1968 | Nunn | 35—35.2 |
| 3,443,865 | 5/1969 | Ishihara | 351—31 |

WILLIAM H. GRIEB, Primary Examiner

U.S. Cl. X.R.

95—62; 351—31; 353—91